United States Patent [19]

Reinboth

[11] Patent Number: 4,664,397
[45] Date of Patent: May 12, 1987

[54] PERAMBULATOR

[76] Inventor: John K. L. Reinboth, 65800 Replot, Finland

[21] Appl. No.: 617,088

[22] PCT Filed: Oct. 10, 1983

[86] PCT No.: PCT/FI83/00062

§ 371 Date: May 30, 1984

§ 102(e) Date: May 30, 1984

[87] PCT Pub. No.: WO84/01549

PCT Pub. Date: Apr. 26, 1984

[30] Foreign Application Priority Data

Oct. 11, 1982 [FI] Finland .................................. 823462

[51] Int. Cl.⁴ .............................................. B62B 7/10
[52] U.S. Cl. ...................................... 280/39; 280/37; 280/647; 280/47.38
[58] Field of Search ..................... 280/39, 647, 47.39, 280/47.38, 47.41, 639, 648, 650, 657, 658, 30, 37

[56] References Cited

U.S. PATENT DOCUMENTS 1,113,280  10/1914  Ambler .................................. 280/39
2,873,820  2/1959   Rizzuto .................................. 188/20
3,442,527  5/1969   Gottfried ........................... 280/47.41

FOREIGN PATENT DOCUMENTS 77098    3/1948  Czechoslovakia ..................... 280/39
2234359  1/1974  Fed. Rep. of Germany .
1098424  8/1955  France ................................. 280/39
1271601  8/1961  France ................................. 280/39
438174   7/1948  Italy .................................... 280/39
638041   5/1950  United Kingdom .

Primary Examiner—David M. Mitchell
Attorney, Agent, or Firm—Scully, Scott, Murphy and Presser

[57] ABSTRACT

The invention relates to a perambulator. The perambulator wheels are, at each side of the perambulator, in pairs (5, 6) mounted to the undercarriage by means of a pivoting element (7) which is pivotable around one longitudinal axle fixed to the undercarriage. The wheels can be pivoted into the undercarriage, which, with the wheels pivoted in, can be placed into the carriage body (8), whereby the perambulator requires little space when it is out of use.

5 Claims, 13 Drawing Figures

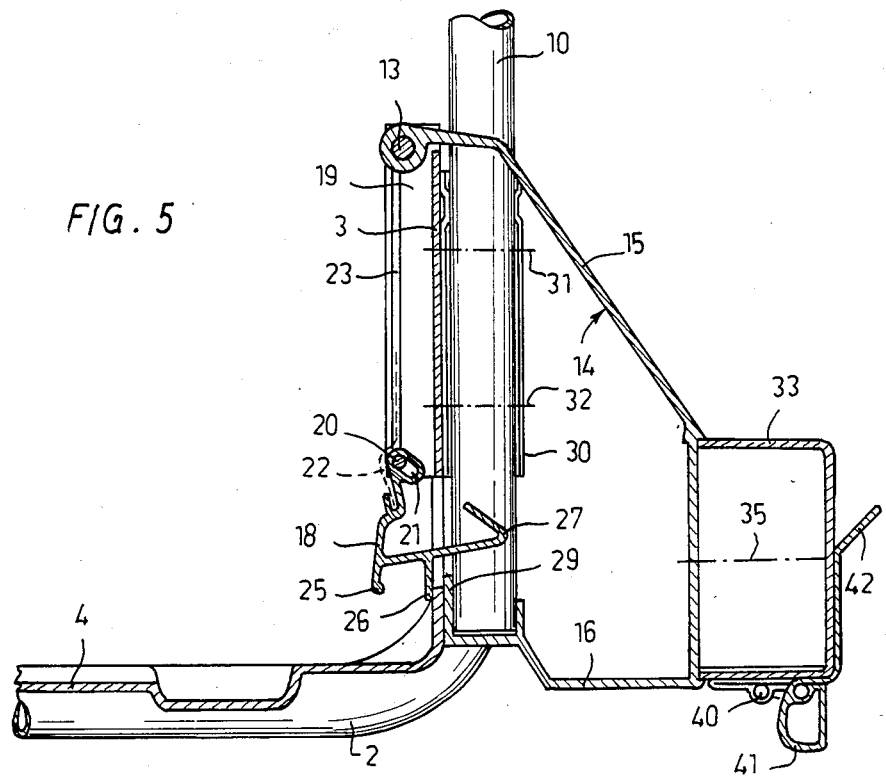
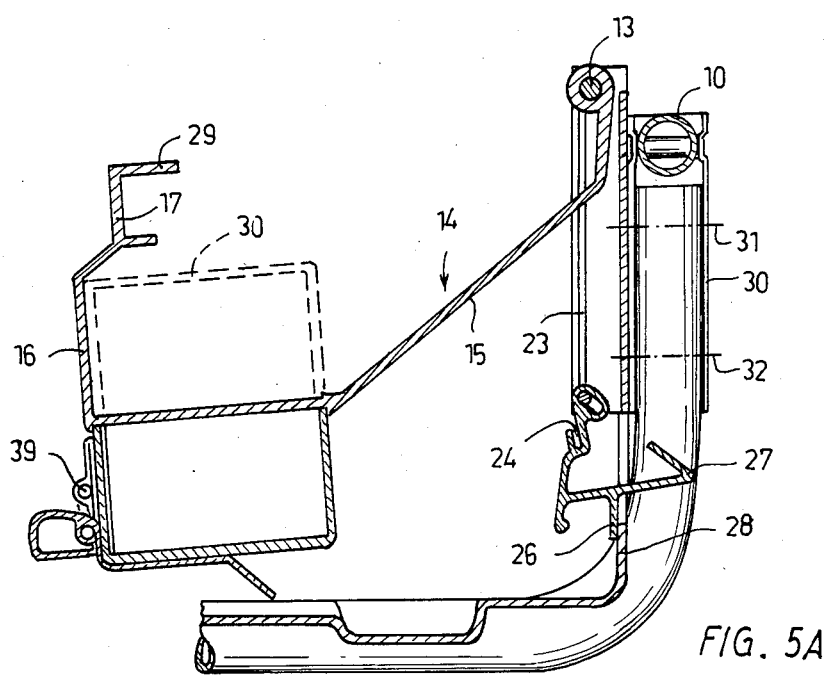

PERAMBULATOR

The present invention is concerned with a perambulator.

In prior art perambulators, the carriage body is supported by lateral supports attached to arms that can be folded up and down like scissors, the rear pair of arms being extended so as to form the pushing bow of the perambulator. Thereby, the body can be lowered so as to rest directly on the undercarriage, whereas the frame remains as of substantially unchanged size, despite the fact that the wheels of the perambulator can usually be detached from the wheel axles passing through the undercarriage. A push carriage of so-called normalsize and designed mainly for sitting is folded together in the same way. Moreover, there are carriages of very light construction that are folded together side-ways, the said light constructions being, however, not suitable for perambulators.

The object of the present invention is to provide a novel perambulator of simple construction and operation and which can be folded together to a considerably smaller size than prior-art perambulators.

The perambulator in accordance with the invention is mainly characterized in that the wheels of the peraxbulator are, in pairs at each side of the perambulator, mounted to the undercarriage by means of a pivoting element pivotable around one longitudinal axle, attached to the undercarriage, between an outer driving position and an inner resting position inside the undercarriage, over an angle of about 270°.

In a preferred embodiment, the pivoting element comprises a pivoting profile provided with a part that, in the driving position of the pivoting element, projects from the undercarriage, means of suspension of the respective pairs of wheels being fixed to the said projecting part, and with a part extending from the said projecting part towards the undercarriage, the pivoting element being arranged to be locked in the driving position by co-operation with supporting arms of the carriage body.

Thus, in the perambulator in accordance with the invention, the wheels can be swung in completely in the lateral direction, e.g. into a basket for merchandise placed on the frame structure of the undercarriage, the said basket being preferably narrow enough so that it can be, in its turn, placed into the carriage body, whereby a decisive economy of space is achieved as compared with prior-art perambulators. In the inner position, the wheels are placed in pairs one pair above the other, in the outer position the pivoting element is locked at each side of the undercarriage automatically when the supporting arms of the carriage body are turned up to the supporting position.

The part of the pivoting profile of the pivoting element projecting from the undercarriage and the suspension means of the respective pairs of wheels are advantageously dimensioned in such a way in relation to each other in the lateral direction that the wheel suspension means alternatively can be fixed to the inside of the pivoting profile, whereat the width of the wheels can be varied; a narrower width can be used if a carriage seat is mounted on the undercarriage.

The wheel suspension means attached to the pivoting profile is preferably provided with a hood with pivot shafts for the forks of the front and rear wheels and with mutually compensating springs for the latter, e.g., in the form of a leaf spring attached to one fork above its pivot shaft and to the other fork below its pivot shaft.

Such a compensating suspension remarkably reduces the tendency of the perambulator to tip forwards or rearwards in the case of uneven loading at either end, and, at the same time, it is capable of noticeably attenuating the inclination of the perambulator forwards and rearwards when moving over recesses or elevations, such as pavement edges.

In order to avoid unnecessary weight and consumption of material, the extension of the pivoting element in the longitudinal direction of the carriage is relatively little, whereby the supporting arms are mounted near the middle of the undercarriage. The upper parts of the supporting arms are therefore directed towards the front end and the rear end of the perambulator, and at the upper ends the arms are in pairs connected by means of transverse carrying supports for the carriage body. The bottom face of the body is preferably provided with catches for contact against the transverse carrying supports in the direction opposite the movement of pivoting-down of the supporting arms. Hereby, the force that is directed by the carriage body at the supporting arms and that tends to pivot these down is substantially absorbed by the catches at the bottom face of the body, whereas the load between the bottom ends of the supporting arms and the locking means holding them remains little.

In the following, the invention will be described in detail with reference to an exemplifying embodiment shown in the attached drawing.

FIG. 5 is a sectional view of the pivoting element in the driving position.

FIG. 5A is a similar sectional view with the pivoting element swung-in.

Figure 1:
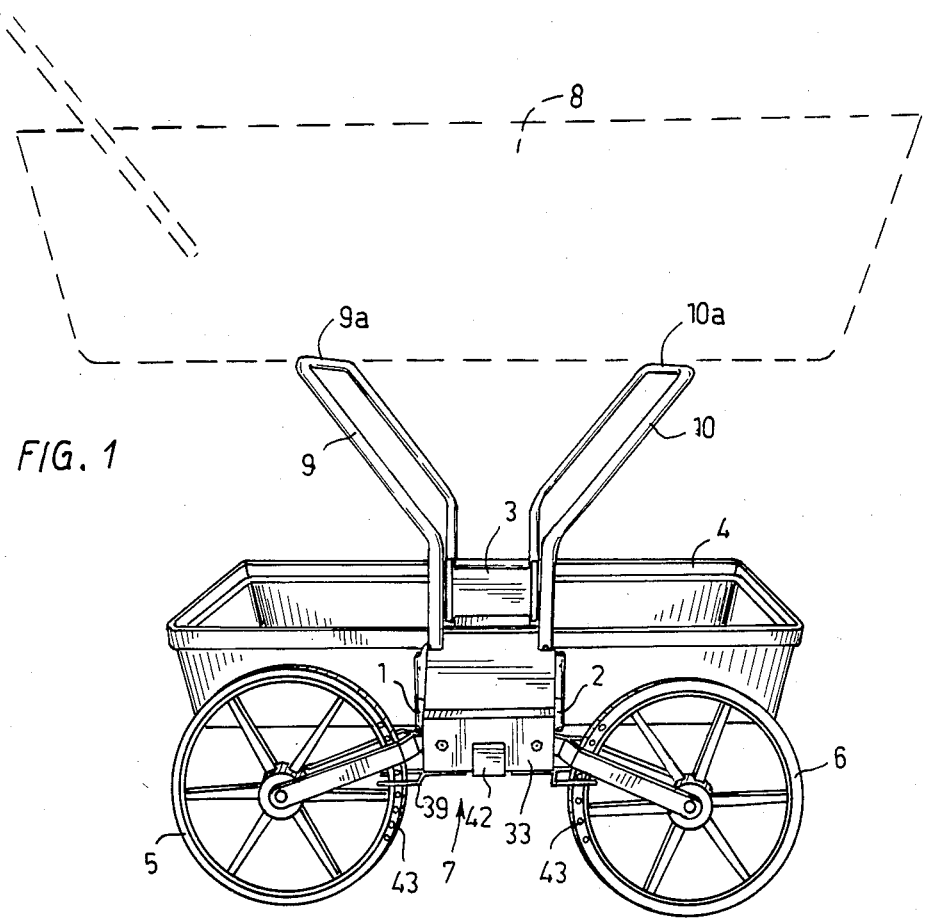
FIG. 1 shows the perambulator in the driving position.
Figure 2:
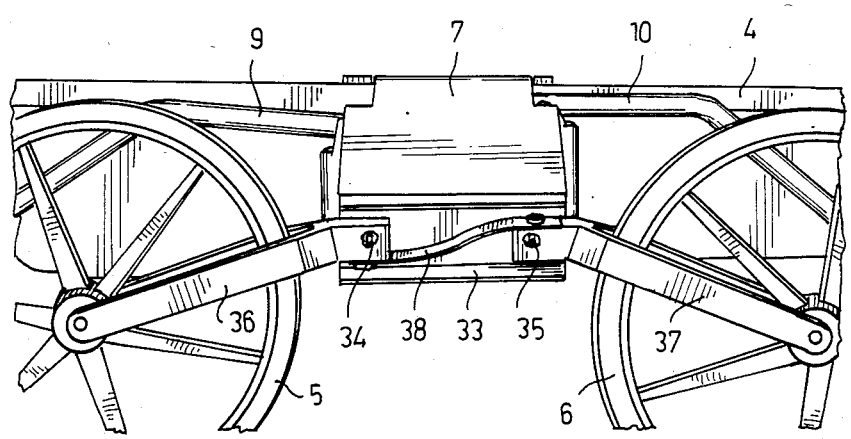
FIG. 2 shows the wheel suspension means.

The undercarriage of the perambulator comprises two transverse frame tubes 1 and 2, formed as a wide U, whose upwardly directed shanks are at each side interconnected by a frame plate 3. On the bottom of the frame tubes 1, 2, a merchandise basket 4 is placed. The wheels 5, 6 of the perambulator are mounted in pairs at each side to the undercarriage by means of a pivoting element generally denoted with 7. The carriage body 8 is carried by two support arms 9, 10, which are mounted to the undercarriage as pivotable around axles 11, 12, which are most clearly seen in FIGS. 3 and 5A.

Figure 3:
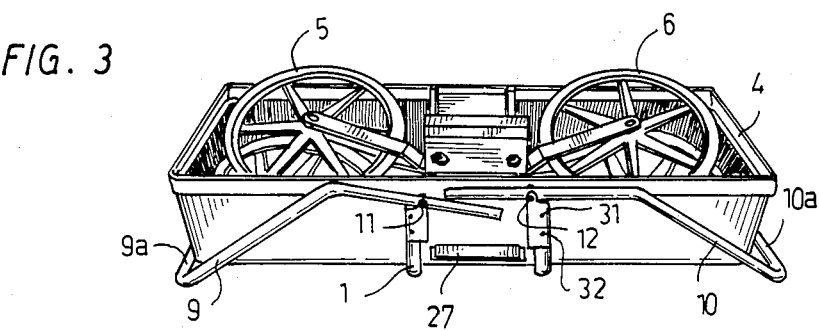
FIG. 3 shows the undercarriage of the perambulator with the wheels pivoted into a merchandise basket.

It is an essential specific feature of the invention that the pivoting element 7 at each side of the perambulator, together with the respective pair of wheels 5, 6, is, after folding-down of the support arms 9, 10, pivotable around a single longitudinal axle 13 attached to the undercarriage, seen in FIGS. 5 and 5A, from the driving position shown in FIGS. 1 and 5 to an inward resting position, wherein each pivoting element with wheels is as a whole positioned inside the U-shanks of the undercarriage, on the bottom of the merchandise basket 4, FIG. 3. The carriage body 8, again, is preferably made to such an extent wider than the undercarriage that the undercarriage with the merchandise basket and with the swung-in wheels can be placed in the carriage body, whereby additional space saving is achieved.

A preferred construction of the pivoting element 7 is shown in FIGS. 5 and 5A, which also illustrate the swinging-in of the pivoting element. The pivoting element is provided with a pivoting profile 14 journalled around a longitudinal axle 13 mounted on the frame plate 3 in two brackets 19, and with a part 15 projecting outwards from the undercarriage in the driving position, FIG. 5, and with a part 16 extending from the part 15 inwards towards the undercarriage, the innermost portion of part 16 being provided with a groove 17. The pivoting profile is kept in the position shown in FIG. 5 by the bottom end of the upwardly turned support arm 10, entering into the groove 17, preferably so that the end of the support arm is supported against the bottom of the groove 17, whereat the load of the body 8 on the axle 12 is reduced. Unintentional folding-down of the support arm 10 is prevented by a locking member 18. After the locking member has been swung free from the support arm 10, the arm can be turned out of its engagement with the groove 17, and the pivoting profile can thereupon be pivoted in to the position shown in FIG. 5A.

The locking member 18 is pivotable around an axle 20 mounted to the fastening brackets 19 of the frame plate 3, in a journalling 21 permitting a displacement in the pivoting plane. The locking member is kept in the position shown in FIGS. 5 and 5A by means of a spring element 22, which may be a metal wire supported in slits 23 in the fastening brackets 19 and arranged so as to run in a slit 24 in the locking member. The locking member is further provided with a handle 25, a stop flange 26 limiting its pivoting outwards, and with a retention part 27. The retention part 27 is dimensioned so that, when the locking member 18 is pivoted clockwise from the position shown in FIG. 5, it collides against the edge 29 of the groove 17, whereat the entire locking member is lifted up in the journalling 21, and after the retention part 27 has by-passed the edge 29, the spring 22 presses the locking member back downwards so that the retention part 27 reaches contact with the edge 29 from the left in FIG. 5. The arm 10 can now be turned down unhindered, whereupon the pivoting profile 14 can be swung in, whereupon the locking member, being pressed by the spring 22, returns to the position shown in FIG. 5A with the stop flange 26 in contact against the edge 28 of an opening formed in the merchandise basket 4. The edge 28 is placed so low down that the retention part 27 is free from it.

When the pivoting profile 14 is pivoted out of the position of FIG. 5A, the edge 29 of the groove 17 goes free from the retention part 27 into contact against the outside of the edge 28 of the merchandise basket. The arm 10 is then pivoted up, whereat its bottom end first pushes off the retention part 27 to the left in FIG. 5, owing to the spring 22, however, not further than that the retention part 27 rests on the egde 29, and, once the arm 10 has by-passed the retention part 27 and reached vertical position, the spring 22 brings out the locking member automatically to the position shown in FIG. 5. As regards the last-mentioned step, reference is also made to FIG. 3, wherein the retention part 27 is seen. In the turned-up position the arm 9 lies between the tube 1 and the retention part 27, whereas the arm 10 lies between the retention part 27 and the tube 2.

As also comes out from FIG. 1, the tubes 1 and 2 constitute limiting stops for the bottom ends of the arms 9 and 10 when turned up. The pivot axles 11 and 12 of the arms are located at different levels and may be mounted to holders 30 enclosing the tubes 1 and 2, which holders 30 are again anchored to the fastening brackets 19 of the frame plate 3, e.g., by means of bolts passing through the holders 30 and the tubes 1 and 2, the said bolts being schematically denoted with numerals 31 and 32 in FIGS. 3 and 5A. The holders 30 of the tubes 1 and 2 are preferably identical, FIG. 3 is in this respect inexact.

Figure 6:
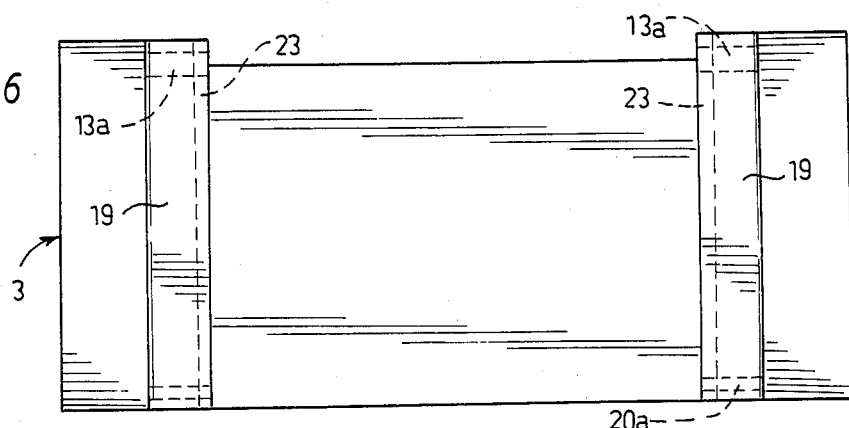
FIG. 6 is a front view of a frame plate.
Figure 7:
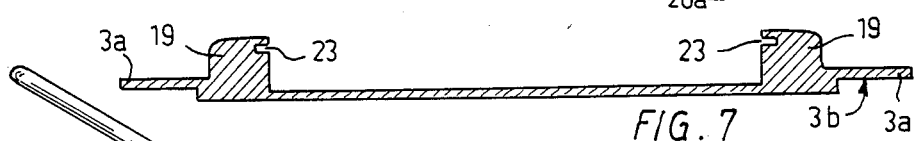
FIG. 7 is a sectional view of the frame plate.

An embodiment of the frame plate 3 is shown in FIGS. 6 and 7. An appropriate starting point is a long profile, whose form comes out from FIG. 7 and which is cut off to frame plates of desired length. The parts 19 resembling rods serve as fastening brackets for the axles 13 and 20, for which bores 13a and 20a, respectively, are formed, as well as for the bolts 31 and 32, whose bores are not shown. The edge flanges 3a are attached to the merchandise basket 4, the faces 3b may be toothed or grooved.

An embodiment of the suspension of the wheels is shown in FIGS. 1, 2, 5 and 5A. On the outside of part 15 of the pivoting profile, a hood 33 is provided, being attached to the pivoting profile, e.g., by means of bolts 34 and 35, which at the same time serve as pivot axles for the wheel forks 36 and 37. A compensating spring system for the forks 36 and 37 is provided preferably by means of a simple leaf spring 38 attached to the bottom side of one fork 36 and to the top side of the other fork 37. The hood 33 is dimensioned so that it can be mounted alternatively inside the pivoting profile 14, as is shown in FIG. 5A.

At the bottom of the hood 33, a brake device is mounted, e.g., comprising two forks 39, schematically shown only in FIG. 1, the said forks extending to both sides of the respective wheels 5 and 6, and the said forks being connected with a lever 40 turnable by means of an eccenter 41 driven by an arm 42 to a stable position in which the forks are in engagement with the sides of the tires of the wheels 5 and 6. In order to improve the locking of the wheels, the sides of the tires may be provided with projecting friction knobs 43. As a rule, it is sufficient to provide a brake device at one side of the carriage only. The lever 40, the eccenter 41, and the arm 42 are shown in FIGS. 5 and 5A. A brake of another type, likewise preferably mounted to the pivoting element 7, may of course be considered.

The lower support points of the support arms 9 and 10 of the carriage body 8 are placed close to each other in the pivoting element 7, and the upper portions of the support arms are therefore directed towards the ends of the carriage body in order to obtain adequate stability. A consequence hereof is that the carriage body 8, by means of its weight on the transverse carrying supports 9a, 10a, tends to fold the support arms 9 and 10 down. In order to avoid an intensive load between the bottom ends of the support arms and the retention part 27 of the locking member 18, stops 44 and 45 are formed in the bottom face of the carriage body 8, the said stops lying against the carrying supports 9a and 10a from the ends of the carriage body.

Figure 4:
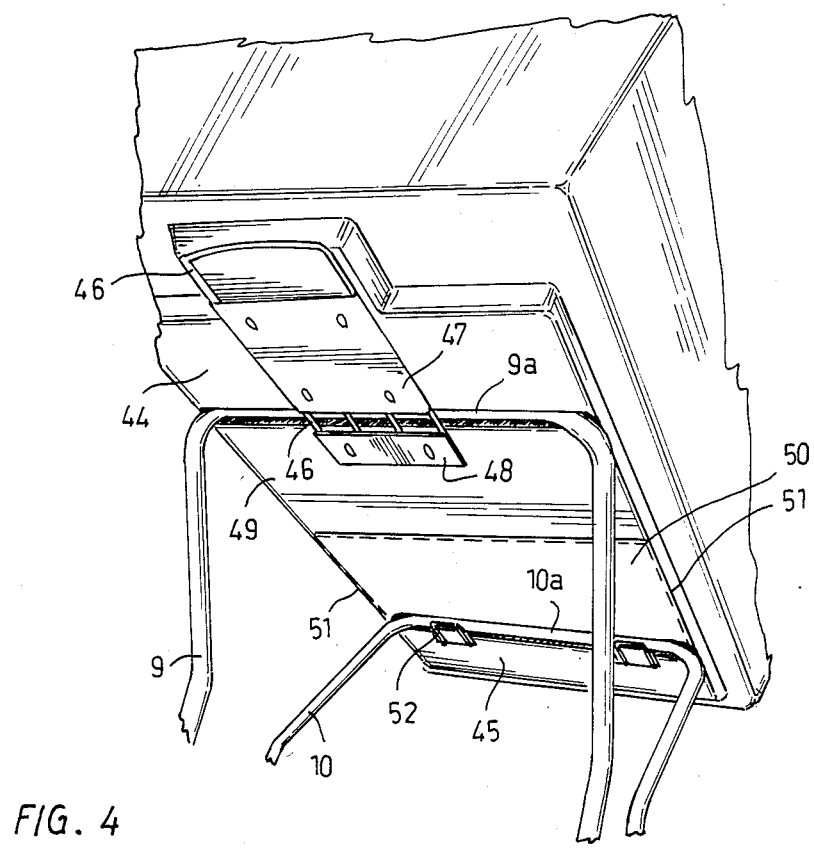
FIG. 4 shows the installation of the supporting arms of the carriage body at the bottom thereof.

Preferably at the rear stop 44, a locking device 46 is attached as displaceable in a holder 47. In the open position, the handle of the locking device 46 extends beyond the rear edge of the carriage body and thereby indicates that the body 8 is not locked on the support arms. In the closed position, shown in FIG. 4, the locking device 46 extends underneath and beyond the carrying support 9a, its end being received by a support holder 48 attached to a portion 49 of the body bottom, placed in the same plane as the stop 44, so that a groove is formed between this portion 49 and the stop 44 for receiving the carrying support 9a.

Forwards from the said stop portion 49, in the body bottom, a recess 50 is formed which ends at the stop 45 for the carrying support 10a. The side edges 51 of the recess 50 function as guides for the carrying support 10a and are preferably shaped so that they correspond to the form of the end portions of the said support 10a.

The carriage body 8 is placed in its position so that the bottom is first placed onto the carrying support 10a, e.g., approximately at the middle of the recess 50, whereupon the body is pulled rearwards until the carrying support 10a lies against the stop 45, and the rear end of the body is placed down onto the carrying support 9a, which fits hereat into the groove between the stops 44 and 49. The locking device 46 is pushed into the position shown in FIG. 4; lifting of the front end of the body is again prevented by the stops 52 mounted on the stop 45, extending to underneath the carrying support 10a. The body 8 lies also in the lateral direction steadily on the carrying supports owing to the edges 51 of the recess 50 and to the corresponding shape of the groove between the stops 44 and 49.

Figure 11:
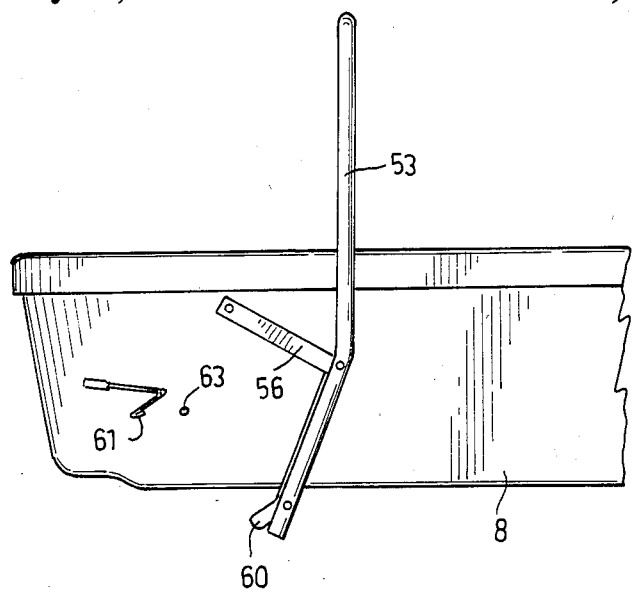
Figure 12:
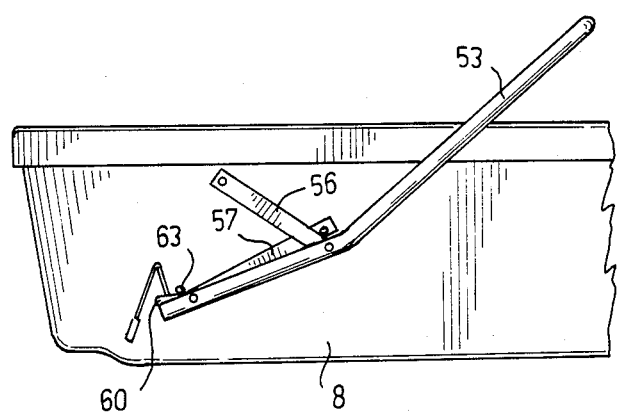

In the perambulator in accordance with the present invention, the driving bow can preferably be mounted on the carriage body. An example of a construction of driving bow is shown in FIGS. 8 to 12. At each shank of the driving bow 53, at the joints 54 and 55, respectively, two arms 56 and 57 are fixed, which are again pivotable around their fastening points 58 and 59 at the side of the carriage body 8. The length of the link arm 56, taken between the link joint 54 and the fastening point 58, is the same as the distance between the fastening points 58 and 59. The driving bow 53 together with the arms 56 and 57 can thereby be pivoted from the driving position shown in FIG. 8 via an intermediate position shown in FIG. 9, wherein the joint 54 is facing the fastening point 59, indicated in FIG. 9 by means of an arrow, either to a folded position shown in FIG. 10, wherein the driving bow 53 substantially follows the edges of the body 8, or to a carrying position shown in FIG. 12, wherein the driving bow 53 is placed approximately at the middle above the carriage body 8. FIG. 11 illustrates an intermediate position from FIG. 9 to FIG. 12.

Figure 8:
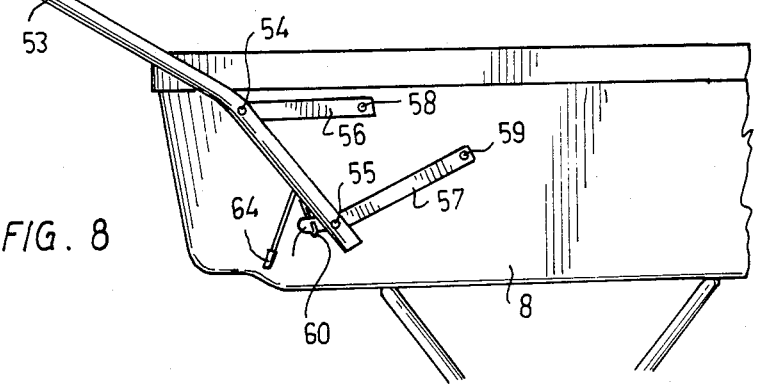
FIGS. 8 to 12 shows the pushing bow structure of the perambulator in different positions.
Figure 9:
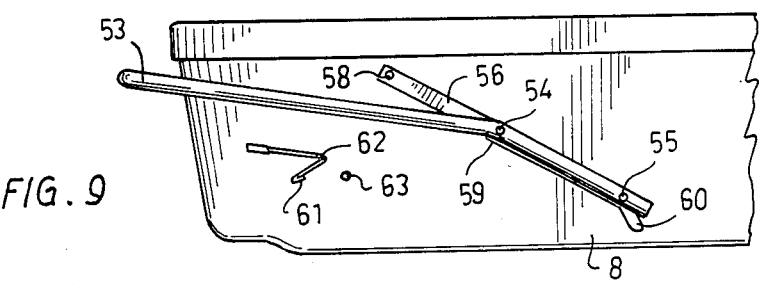
Figure 10:
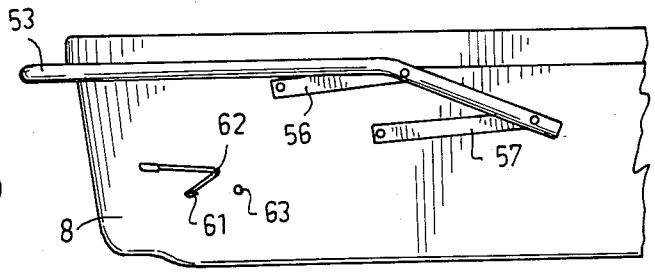

The driving bow 53 is locked in the position of FIG. 8 against pivoting downwards by means of a hook 61 attached pivotably, the said hook grasping underneath an extension 60 of the arm 57 beyond the link point 55. The fastening point 62 of the hook 61 is seen in FIGS. 9 to 12. Against pivoting further upwards, the driving bow 53 is locked in the position of FIG. 8, by means of a stop 63 visible in FIGS. 9 to 12, against which the arm 57 or its extension 60 lies from below. In the same way, the driving bow is locked in the carrying position of FIG. 12, even though the hook 61 is not visible there. In connection with the locking hook 61, a carrying hook 64 for a bag or equivalent is also formed.

Alternative embodiments instead of the locking hook 61 shown may, of course, be conceived. Thus, for example, a short bushing may be placed at the joint 55 between the driving bow 53 and the arm 57, whereat a pivotable hook can be brought into engagement around the said bushing; in this case, the hook would be placed in its own pivoting plane and not perpendicularly to that plane, like in the drawing. No locking device has been shown for the position shown in FIG. 10; one possible device might be a grasping member pivotable in a plane perpendicular to the plane of the figure and attached to the edge of the body 8. A corresponding locking arrangement is provided at the other side of the carriage body, not shown in the drawing.

The invention is, of course, not confined to the embodiment shown in the drawing only. The part 15 of the pivoting profile 14 may pass directly down to the groove 17 if one is prepared to abandon the possibility to vary the width of installation of the wheels, and the groove 17 does not have to be continuous. The pivot shaft 13 of the pivoting profile may be placed further to the right in FIGS. 5 and 5A if the top edge of the frame plate 3 between the shaft fastening brackets 19 is made lower, so that a pivoting movement of the pivoting profile by about 270° is not prevented. The flange 26 of the pivotable locking member 18 does not have to lie against the edge 28 of the merchandise basket 4, but the frame plate 3 may run correspondingly lower down and be provided with an opening for the retention part 27. The merchandise basket 4 may be omitted entirely, in which case the wheels would, in the swung-in position, lie with their forks on the frame tubes 1 and 2. The frame plate 3 and the frame tube holders 30 may be made of one piece. The construction of the driving bow in accordance with the FIGS. 8 to 12 has been included in the description only in order to give an example of a complete embodiment of the perambulator; other embodiments of driving bows may very well be employed in themselves without affecting the construction underneath the carriage body, which construction constitutes the essence of the invention within the scope of the following patent claims.

What is claimed is:

1. A perambulator comprising:
   a carriage body having two pairs of pivotable support arms attached to a bottom face of said carriage body, each of said pairs of support arms having upper ends connected by means of transverse carrying supports. the bottom face of said carriage body being provided with stops for contact against said transverse carrying supports in the direction opposite a downward pivoting movement of the support arms;
   an undercarriage having a pair of wheels on each side thereof and a means of suspension for each pair of wheels;
   each of said pair of wheels being mounted on each side of said undercarriage by a pivoting element pivotable around one longitudinal axle attached to the undercarriage, said pivoting element pivoting said wheels between an outer driving position and an inner resting position inside the undercarriage, over an angle of about 270°;
   said pivoting element including a profile having a first part that, in the driving position of the pivoting element, projects outward from the undercarriage, said means for suspension of said respective pairs of wheels being fixed to said first part, and said profile having a second part extending from said projecting first part inward towards the undercarriage for abutment thereto in the driving position, and means for locking said pivoting element in the driving position by cooperation with the support arms of the carriage body.

2. A perambulator as claimed in claim 1, characterized in that the longitudinal pivot axle (13) of each pivoting element (7) is fixed to a frame plate (3) connected with vertical support members (1, 2) of the undercarriage, that above the upper ends of the said respective vertical support member (1, 2) and inside these members, relative to the longitudinal direction of the perambulator, transverse pivot axles (11, 12) are mounted for the support arms (9, 10) of the carriage body (8), so that the vertical support members (1, 2) constitute stops for the bottom ends of the support arms on pivoting movement of the support arms to the upwardly pivoted position intended for carrying the carriage body (8), that a locking member (18) is provided between the support arms (9, 10) below their pivot axles (11, 12) for retaining the support arms (9, 10) in the upwardly pivoted position and that the second part (16) of the pivoting profile (14) of the pivoting element (7) extending towards the undercarriage is provided with recesses, in the form of a longitudinal groove (17), for receiving the bottom ends of the support arms (9, 10) when these are in the upwardly pivoted position.

3. A perambulator as claimed in claim 1, characterized in that the spring arrangement of the wheel forks (36, 37) comprises a leaf spring (38) attached to one fork (37) above its pivot axle (35) and to the other fork (36) below its pivot axle (34).

4. A perambulator as claimed in claim 1 characterized in that upper ends of the support arms (9, 10) of the carriage body are pivotable and in pairs connected by means of transverse carrying supports (9a, 10a) and that the bottom face of the carriage body (8) is provided with stops (44, 45) for contact against the said transverse carrying supports (9a, 10a) in the direction opposite the movement of pivoting-down of the support arms.

5. A perambulator as claimed in claim 4, characterized in that at least at one of the stops (44), a locking device (46) is provided as fixed to the bottom of the carriage body and displaceable to underneath the respective transverse carrying support (9a), the said locking device being preferably formed so that, in the open position, it projects out of the nearest end of the carriage body.

* * * * *